United States Patent [19]
Goetz

[11] Patent Number: 5,184,846
[45] Date of Patent: Feb. 9, 1993

[54] INFLATOR ASSEMBLY

[75] Inventor: George W. Goetz, Rochester Hills, Mich.

[73] Assignee: TRW Vehicle Safety Systems Inc., Lyndhurst, Ohio

[21] Appl. No.: 786,276

[22] Filed: Nov. 1, 1991

[51] Int. Cl.$^5$ ............................................ B60R 21/26
[52] U.S. Cl. .................................. 280/736; 280/740; 280/741; 422/164
[58] Field of Search ................ 422/164, 305; 280/736, 280/740, 742, 741

[56] References Cited

U.S. PATENT DOCUMENTS 4,136,894  1/1979  Ono et al. ............................ 280/741

FOREIGN PATENT DOCUMENTS 2443267  3/1975  Fed. Rep. of Germany ...... 280/741

*Primary Examiner*—Tamara L. Graysay
*Attorney, Agent, or Firm*—Tarolli, Sundheim & Covell

[57] ABSTRACT

An apparatus for inflating a vehicle occupant restraint includes a container which stores gas. A body of pyrotechnic material is ignitable to supply combustion products to heat the gas in the container and to add generated gas to supplement the gas in the container. The combustion products from the ignitable body of pyrotechnic material are conducted along a helical path in the container chamber to separate certain materials from gaseous materials in the combustion products while heating the gas in the chamber with the combustion products. A flow of combustion products is directed along a first portion of the helical path toward a closed end of the container opposite to an outlet from the container. The flow of combustion products contacts the closed end of the container and is deflected back toward an outlet end of the container along a second portion of the helical path. The second portion of the helical path has a diameter which is smaller than the diameter of the first portion of the helical path.

16 Claims, 2 Drawing Sheets

INFLATOR ASSEMBLY

BACKGROUND OF THE INVENTION

The present invention relates to a new and improved inflator assembly for inflating a vehicle occupant restraint, such as an air bag.

An inflator assembly for inflating an air bag commonly includes a gas generating material. The gas generating material, when ignited, generates gas which is directed into the air bag. Certain gas generating materials, when ignited, also generate combustion products such as particulate material and molten material. It is desirable to remove these combustion products from the generated gas prior to the gas entering the air bag. To this end, many inflators include filters and tortuous gas flow paths which trap the particulate material and on which the molten material plates out of the gas flow.

An inflator assembly for inflating an air bag is disclosed in U.S. Pat. No. 3,618,981. This patent discloses an inflator containing a gas generating material which is ignitable to provide gas for inflating the air bag. The generated gas contacts a deflector having curved vanes which deflect the generated gas outwardly toward a wall of a chamber. The generated gas flows from the chamber into the air bag to inflate the air bag. The inflator has structure for minimizing molten material and particulate material generated by ignition of the gas generating material from entering the air bag.

Another inflator assembly for inflating an air bag is disclosed in U.S. Pat. No. 3,723,205. This inflator assembly includes a container which holds gas under pressure. When the air bag is to be inflated, a squib is actuated to ignite a gas generating material. As the gas generating material burns, the pressure in the container is increased due to the gas and heat created by burning of the gas generating material. When a predetermined pressure is reached, a burst disk is ruptured to enable the gas to flow from the container to the air bag.

SUMMARY OF THE INVENTION

An improved apparatus for inflating a vehicle occupant restraint, such as an air bag, includes a container having a chamber which holds gas. A body of propellant is ignitable to heat the stored gas and to form gas and other combustion products such as molten material and particulate material. In order to at least partially separate the molten and particulate materials from the gas while heating the stored gas in the chamber with the combustion products, the combustion products are directed along a generally helical path in the chamber.

The combustion products flow along a first portion of the helical path in a direction toward a closed end of the chamber containing the stored gas. The combustion products then flow back along a second portion of the helical path toward an opening at the opposite end of the chamber. During movement of the combustion products along the helical path, centrifugal force causes particulate material in the combustion products to be deposited against the walls defining the chamber and molten material to plate out of the gas flow onto the walls defining the chamber.

BRIEF DESCRIPTION OF THE DRAWINGS

The foregoing and other objects and features of the present invention will become more apparent to one skilled in the art to which the present invention relates upon reading the following description of the invention with reference to the accompanying drawings, in which.

DESCRIPTION OF PREFERRED EMBODIMENTS OF THE INVENTION

Figures 1, 1A:
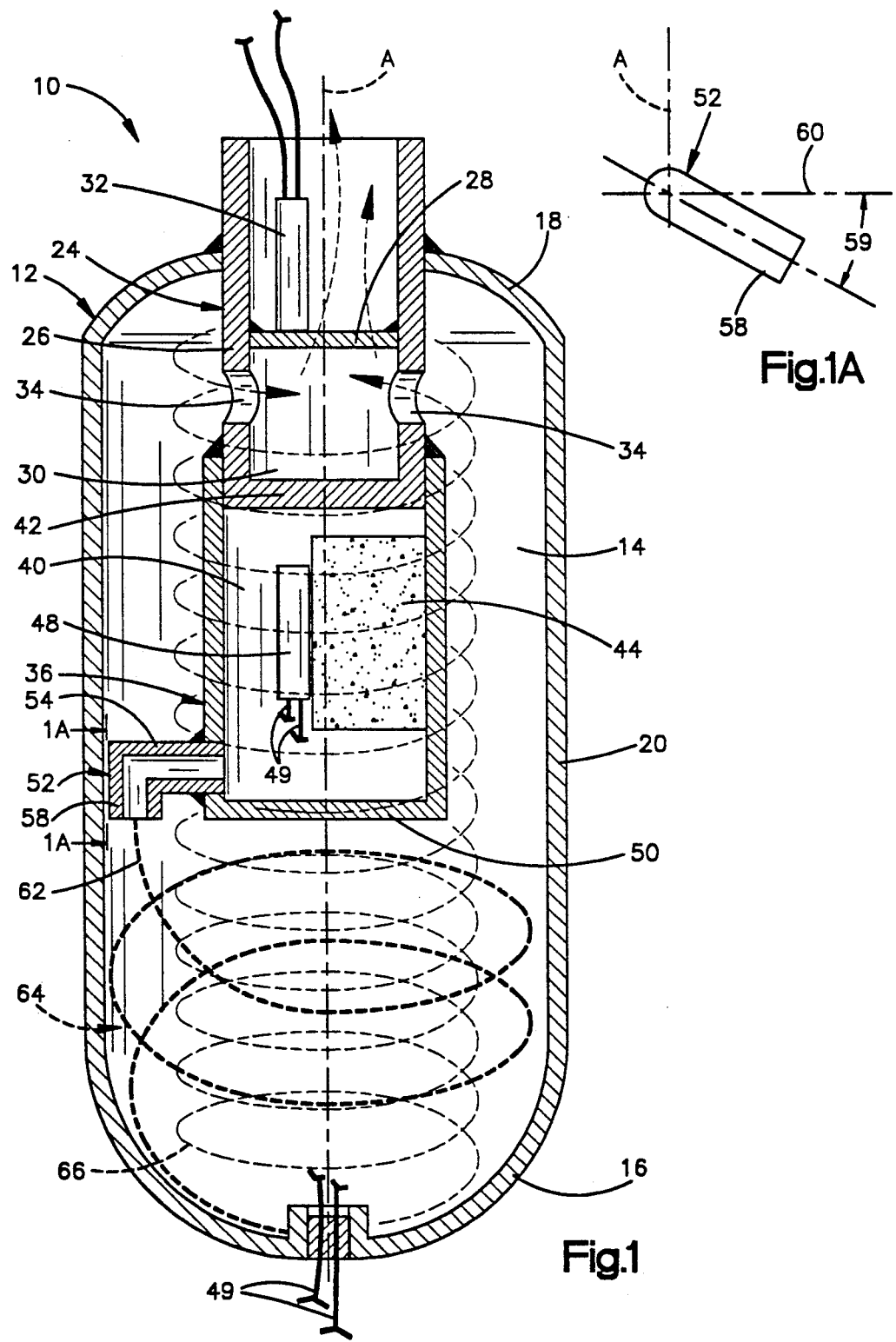
FIG. 1 is a schematic sectional view of an inflator assembly which is constructed in accordance with the present invention.
FIG. 1A is a schematic fragmentary view, taken generally along the line 1A—1A of FIG. 1, further illustrating the construction of the inflator assembly.

The present invention relates to an inflator assembly for inflating a vehicle occupant restraint, such as an air bag. The inflator assembly may have a variety of different constructions. FIG. 1 illustrates an inflator assembly 10 which is representative of the present invention.

The inflator assembly 10 includes a generally cylindrical container 12 which defines a chamber 14. The chamber 14 is filled with gas under pressure. The gas stored in the chamber 14 is preferably argon. The argon gas is preferably stored in the chamber 14 at a pressure of 2,000 to 3,500 psi. The chamber 14 could contain other gases at different pressures if desired. For example, the chamber 14 could contain air or nitrogen.

The container 12 has a closed end wall 16 with a generally hemispherical configuration. An outlet end wall 18 is disposed at the end of the container 12 opposite from the closed end wall 16 and also has a generally hemispherical configuration. A cylindrical side wall 20 extends between the hemispherical end walls 16 and 18.

A cylindrical outlet manifold 24 has a cylindrical side wall 26 which is fixedly connected, such as by welding, to the outlet end wall 18 of the container 12. A circular diaphragm or wall 28 is provided in the outlet manifold 24. The wall 28 is spaced apart from a wall 42 of the outlet manifold 24. The walls 28 and 42 in part define a cylindrical manifold chamber 30. Circular openings 34 are formed in the side wall 26 of the outlet manifold 24 and communicate chamber 14 with manifold chamber 30. A squib or blasting cap 32 is mounted adjacent the wall 28. When ignited, the squib 32 ruptures the wall 28 and provides an opening through which gas may flow from the cylindrical manifold chamber 30.

A cylindrical metal housing 36 is connected, such as by welding, with an inner end of the outlet manifold 24 adjacent wall 42. The housing 36 contains a cylindrical relationship with the manifold chamber 30. The outer or upper (as viewed in FIG. 1) end of the ignition chamber 40 is blocked by the circular end wall 42 of the outlet manifold 24. The inner or lower end of the ignition chamber 40 is blocked by a circular end wall 50 of the housing 36.

A body 44 of propellant is disposed in the ignition chamber 40. The body 44 of propellant is formed of pyrotechnic material. Although the body 44 of propellant could have many different compositions, in one specific embodiment of the invention, the body of propellant may have the following composition:

| Percent by Weight | Ingredient |
| --- | --- |
| 73% | Potassium perchlorate |

-continued

| Percent by Weight | Ingredient |
|---|---|
| 8.7% | Dioctyl adipate |
| 6.6% | Polyvinyl chloride |
| 0.05% | Carbon black |
| 0.15% | Stabilizers (Boron, Chromium) |
| 11.5% | Potassium nitrate |

Alternatively, the body of propellant may have the following formulation, which is identified by the Universal Propulsion Company, Inc., Talley Industries, as X167-31 (UPCo 6002):

| Ingredient | Weight % |
|---|---|
| Geon 121 AR | 5.594 |
| DOA | 8.390 |
| Thermcheck 120 | 0.149 |
| Thermcheck SV100 | 0.075 |
| Sodium carbonate | 4.742 |
| Iron oxide | 0.050 |
| Potassium Perchlorate, 200 | 52.650 |
| Potassium Perchlorate, 20 | 28.350 |

Although the body 44 of propellant is shown in FIG. 1 as being offset to one side of the center of the ignition chamber 40, the body of propellant could substantially fill the ignition chamber 40. It could also have a different shape than illustrated, such as a cylindrical or multilobe shape. If desired, passages could be provided through the body of propellant. Any passages through the body of propellant would provide surface areas which would increase in area as the surface area on the outside of the body of propellant decreased in area during burning of the body of propellant.

A squib or blasting cap 48 is provided in the ignition chamber 40 to ignite the body 44 of propellant. The squib 48 is ignited by electrical current conducted over wires 49. Although the squib 48 has been shown as being disposed along a side of the body 44 of propellant, the squib 48 could be disposed at the axially outer or upper (as viewed in FIG. 1) end of the ignition chamber 40. The body 44 of propellant could then be disposed at the axially inner or lower (as viewed in FIG. 1) end of the ignition chamber 40.

A conduit 52 is provided to conduct combustion products from the ignition chamber 40 to a location adjacent to the side wall 20 of the container 12. The conduit 52 includes a radially extending main section 54 which is in communication with the ignition chamber 40 adjacent to the end wall 50. The main section 54 of the conduit 52 conducts a flow of combustion products radially outwardly from the cylindrical housing 36.

An outlet end portion 58 of the conduit 52 is skewed downward toward the end wall 16 (as viewed in FIG. 1A) at an acute angle 59 of approximately twenty degrees (20°). Angle 59 is measured relative to a radial plane 60 extending through the cylindrical side wall 20 of the container 12 perpendicular to a longitudinal central axis A of the container. While the angle 59 is shown as 20°, the angle 59 could be other than 20°. Thus, the main section 54 of the conduit 52 extends in a radial direction relative to the side wall 20 of the container 12 and in a radial direction relative to the ignition chamber 40. The outlet end portion 58 of the conduit 52 extends toward the closed end wall 16 of the container 12 at an angle 59 of approximately 20° (as viewed in FIG. 1A) relative to the radial plane 60.

The cylindrical side wall 20 of the container 12 cooperates with the outlet end portion 58 of the conduit 52 to cause the combustion products from the ignition chamber 40 to flow toward the closed end wall 16 along an initial portion 62 of a helical path 64. When the helical flow of combustion products impinges against the generally hemispherical closed end wall 16, the helical flow of combustion products is turned back toward the outlet end wall 18 of the container 12 along a second portion 66 of the helical path 64. In FIG. 1 of the drawings, the initial portion 62 along which the combustion products flow toward the closed end wall 16 has been indicated in relatively wide dashed lines. The second portion 66 of the helical path 64 along which the combustion products flow toward the outlet end wall 18 has been indicated in relatively narrow dashed lines in FIG. 1.

The generally hemispherical closed end wall 16 of the container 12 cooperates with the helical flow of combustion products in such a manner as to result in the second portion 66 of the helical path 64 having a smaller diameter than the initial portion 62 of the helical path. Thus, the initial portion 62 of the helical path circumscribes the lower (as viewed in FIG. 1) part of the second portion 66 of the helical path. The second portion 66 of the helical path 64 along which the combustion products flow extends around the ignition chamber housing 36 and lower (as viewed in FIG. 1) portion of the cylindrical side wall 26 of the outlet manifold 24.

Upon the occurrence of sudden vehicle deceleration, a deceleration sensor (not shown) of known construction completes an electrical circuit to ignite the squib or blasting cap 32 and the squib or blasting cap 48. The wires 49 for effecting ignition of the squib 48 preferably extend into the ignition chamber 40 through the conduit 52. Ignition of the squib or blasting cap 32 ruptures the diaphragm or wall 28. Unheated gas stored in the container 12 flows from the main chamber 14 through the manifold openings 34 and through the opening formed in the wall 28 by ignition of the squib 32. The gas flow is conducted to a diffuser (not shown) and an air bag to initiate inflation of the air bag.

Ignition of the squib 48 ignites the body 44 of propellant. As the body 44 of propellant burns, hot combustion products are conducted from the ignition chamber 40 through the conduit 52 to the main chamber 14. As the hot combustion products leave the outlet end portion 58 of the conduit 52, they are directed downwardly (as viewed in FIG. 1) at the angle 59 to the radial plane 60 extending through the cylindrical side wall 20 of the container 12.

The downward flow of combustion products impinges against the cylindrical side wall 20 of the container 12. This causes the combustion products to flow along the initial portion 62 of the helical path 64 toward the closed end wall 16 of the container 12. In one specific embodiment of the invention, the flow of combustion products from the outlet end portion 58 of the conduit 52 had a speed of approximately 2,000 feet per second. In this embodiment of the invention, the side wall 20 of the container 12 had a radius of approximately one inch. This resulted in the combustion products moving at approximately 22,500 radians per second. This results in the combustion products being subjected to a centrifugal acceleration of approximately 42,200,000 feet per second per second or 1,310,000 times the force of gravity.

The centrifugal force on the particulate and molten materials in the combustion products causes the particulate and molten materials to move radially outward in the chamber 14. The particulate material engages and adheres to the cylindrical side wall 20 of the container 12. The molten material, such as potassium chloride (KCl) salt, plates out on the inner side surface of the side wall 20. As the swirling combustion products move downward along the initial portion 62 of the helical path 64 into contact with the closed end wall 16, particulate and molten materials in the combustion products are also deposited along the closed end wall 16.

The closed end wall 16 cooperates with the helical flow of combustion products to direct the helical flow upward (as viewed in FIG. 1) toward the outlet end wall 18 of the container 12 along the second portion 66 of the helical path 64. As the combustion products move along the second portion 66 of the helical path 64, the centrifuging action continues with continued separation of particulate and molten materials in the combustion products from the gaseous materials in the combustion products. The second portion 66 of the helical path 64 extends around the ignition chamber housing 36 to the manifold chamber openings 34. The combustion products flow through the manifold chamber openings 34 and the opening formed in the end wall 28 to the occupant restraint.

During movement of the combustion products from the ignition chamber 40 along the helical path 64, a substantial reduction in the amount of particulate material in the combustion products takes place. It is believed that approximately 90% of the particulate and molten materials in the combustion products are separated from the gaseous materials in the combustion products. This minimizes the particulate and molten materials which are conducted into the air bag during inflation of the air bag.

During movement of the hot combustion products along the helical path 64 in the main chamber 14, the hot combustion products heat the stored gas in the main chamber 14 to increase the fluid pressure in the main chamber 14 even though an opening has been formed in the outlet manifold wall 28. Therefore, to inflate an air bag of a given volume, the amount of stored gas and the volume of the container 12 can be minimized. In addition, the gas generated by burning of the body 44 of propellant supplements the stored gas to further increase the volume of gas available to inflate the air bag.

Second Embodiment of the Invention

Figure 2:
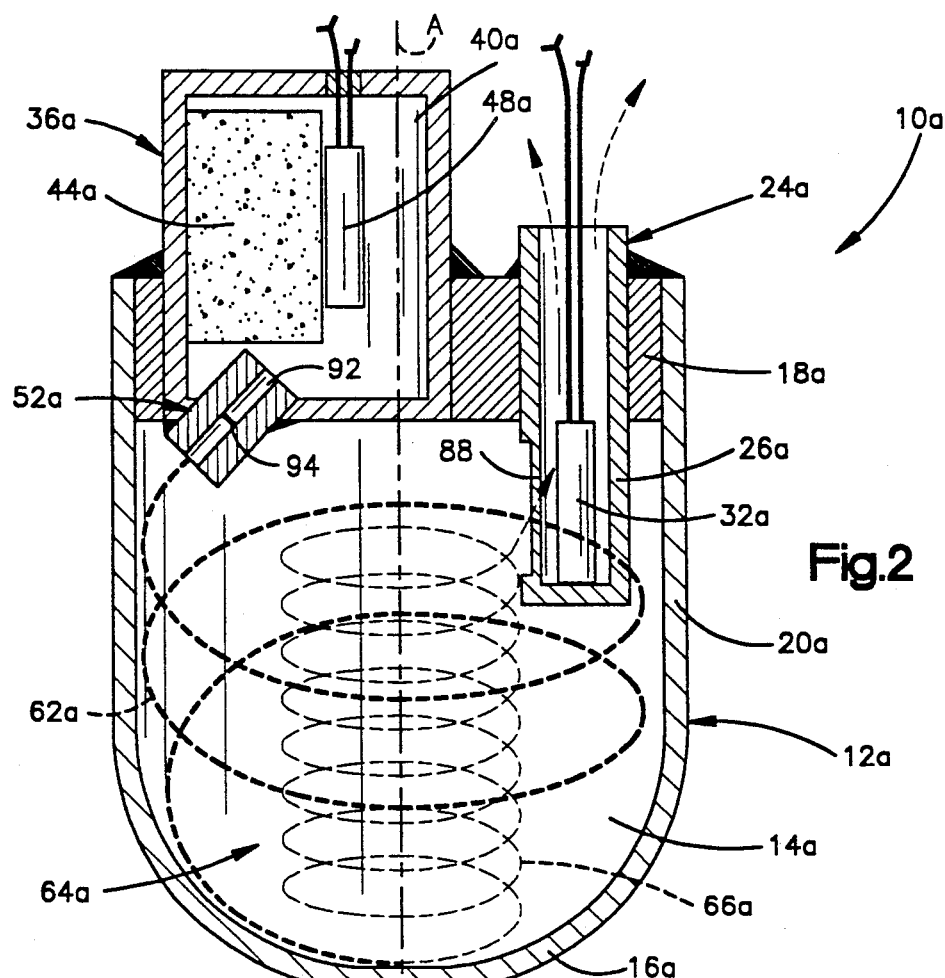
FIG. 2 is a sectional view of a second embodiment of an inflator assembly embodying the present invention.

In the embodiment of the invention illustrated in FIG. 1, the ignition chamber housing 36 is disposed in the main chamber 14 of the container 12. The body 44 of propellant is connected in fluid communication with the main chamber 14 through the conduit 52. In the embodiment of the invention illustrated in FIG. 2, the ignition chamber housing is disposed outside the main chamber in the container. In addition, a diaphragm is provided to block fluid communication between the main chamber in the container and an ignition chamber containing a body of propellant. Since the embodiment of the invention illustrated in FIG. 2 is generally similar to the embodiment of the invention illustrated in FIG. 1, similar numerals will be utilized to designate similar components, the suffix letter "a" being added to the numerals of FIG. 2 to avoid confusion.

An inflator assembly 10a (FIG. 2) includes a container 12a having a main chamber 14a for storing gas (preferably argon) under pressure. The container 12a includes a generally hemispherical closed end wall 16a and a flat generally circular outlet end wall 18a opposite from the closed end wall 16a. A cylindrical side wall 20a interconnects the end walls 16a and 18a.

An outlet manifold 24a has a cylindrical side wall 26a. The outlet manifold 24a is connected in fluid communication with a diffuser (not shown) and an air bag (not shown). The cylindrical outlet manifold side wall 26a extends into the main chamber 14a.

A squib or blasting cap 32a is disposed in the outlet manifold 24a. Upon ignition of the squib 32a, an opening is formed in a relatively thin or weakened side portion 88 of the manifold wall 26a. Upon formation of the opening in the weakened side portion 88 of the manifold wall 26a, the main chamber 14a in the container 12a is connected in fluid communication with the diffuser and air bag through the outlet manifold 24a.

A cylindrical ignition chamber housing 36a is disposed outside of the container 12a and is connected with the end wall 18a of the container. A cylindrical ignition chamber 40a in the housing 36a holds a body 44a of propellant. A squib 48a is provided in the ignition chamber 40a. Upon ignition of the squib 48a, the body 44a of propellant is ignited.

A conduit 52a is provided to conduct combustion products from the ignition chamber 40a to the main chamber 14a of the container 12a. The conduit 52a has a central passage 92 which is blocked by a diaphragm 94. The diaphragm 94 normally blocks fluid communication between the main chamber 14a and the ignition chamber 40a. However, upon ignition of the body 44a of propellant, the fluid pressure in the ignition chamber 40a increases. The increased pressure ruptures the diaphragm to enable combustion products from the burning body 44a of propellant to be conducted through the conduit 52a into the main chamber 14a.

The conduit 52a is pointed downward (as viewed in FIG. 2) toward the closed end wall 16a of the container 12a and is skewed relative to a radial plane perpendicular to the axis A of the container 12a and extending through the side wall 20a of the container 12a. In this embodiment of the invention, the conduit 52a is skewed at an angle of approximately 45° to the radial plane. The conduit 52a is skewed in the same manner as the conduit 52 in the embodiment of FIGS. 1 and 1A but the angle of skew is different. The conduit 52a could be skewed at a different angle relative to the radial plane if desired.

The conduit 52a directs a flow of combustion products from the ignition chamber 40a downward (as viewed in FIG. 2) toward the closed end wall 16a along on initial portion 62a of a helical path 64a. As the combustion products move along the initial portion 62a of the helical path 64a, angular acceleration of the combustion products results in the particulate and molten materials in the combustion products being centrifugally deposited against the side wall 20a of the container 12a. The end wall 16a turns the helical path 64a upward.

The combustion products flow away from the end wall 16a along a second portion 66a of the helical path 64a toward the opposite end wall 18a. The diameter of the second portion 66a of the helical path 64a is less than the diameter of the initial portion 62a of the helical path. Therefore, the initial portion 62a of the helical path 64a circumscribes or extends around the second portion 66a of the helical path.

As the combustion products move upwardly along the second portion 66a of the helical path, the centrifuging action continues and particulate and molten materials in the combustion products continue to be deposited against the side wall 20a of the container 12a. The manner in which the particulate and molten materials are separated from the gaseous material of the combustion products resulting from burning of the body 44a of propellant in the ignition chamber 40a is the same as was previously described in connection with the embodiment of the invention illustrated in FIG. 1.

The combustion products, from which most of the particulate and molten materials have been separated by the centrifuging action as the combustion products flow along the helical path 64a, are conducted through the opening formed in the outlet manifold wall 26a by ignition of the squib 22a. The gaseous combustion products are conducted through the outlet manifold 24a and the diffuser (not shown) to an air bag or other inflatable occupant restraint.

Third Embodiment of the Invention

In the embodiments of the invention shown in FIGS. 1 and 2, the inflator assemblies are adapted for mounting in the instrument panel of a vehicle. In the embodiment of the invention illustrated in FIG. 3, the inflator assembly is adapted to be mounted in the steering wheel of a vehicle. Since the embodiment of the invention illustrated in FIG. 3 is generally similar to the embodiment of the invention illustrated in FIGS. 1 and 2, similar numerals will be utilized to designate similar components, the suffix letter "b" being associated with the numerals of FIG. 3 to avoid confusion.

Figure 3:
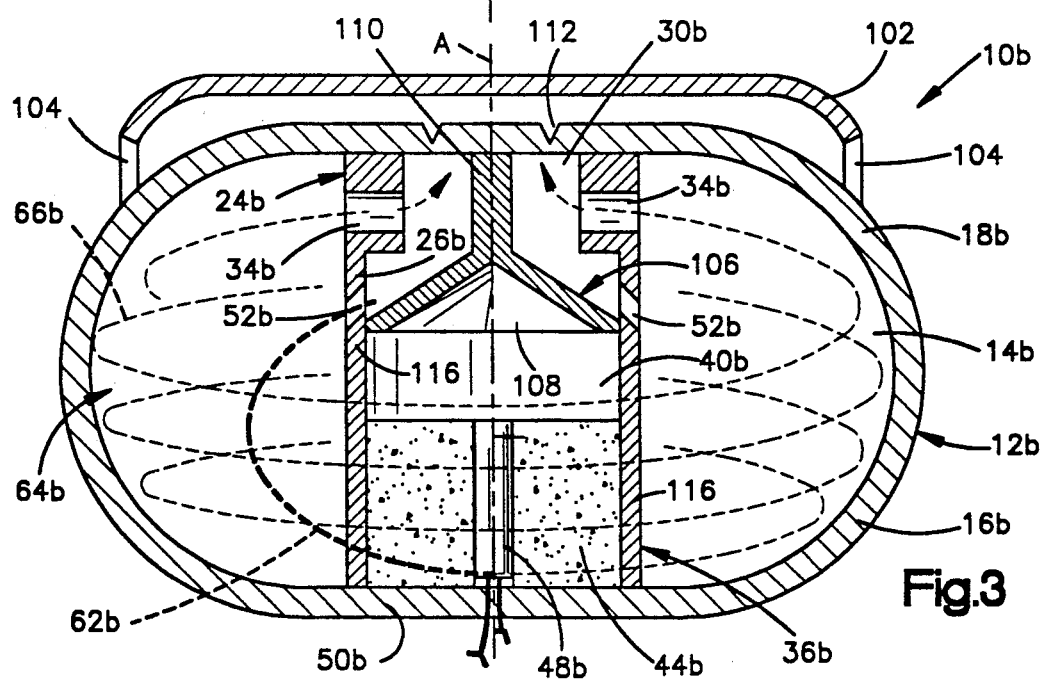
FIG. 3 is a sectional view of a third embodiment of an inflator assembly embodying the present invention.

The inflator assembly 10b of FIG. 3 includes a container 12b having a main chamber 14b in which gas is stored under pressure. The container 12b includes a generally hemispherical closed end wall 16b and a generally hemispherical outlet end wall 18b. The end walls 16b and 18b are connected together. If desired, a short cylindrical side wall portion could be provided between the hemispherical end walls 16b and 18b.

An outlet manifold 24b is connected with the outlet end wall 18b. The outlet manifold 24b includes a cylindrical side wall 26b. Openings 34b are formed in the side wall 26b.

A piston 106 is provided in the outlet manifold 26b. The piston 106 has a conical lower end 108 and a cylindrical upper end 110. An annular groove 112 is formed in the end wall 18b to form an opening when the piston 106 is moved upward (as viewed in FIG. 3). Fluid can then flow from an outlet manifold chamber 30b through the opening in the end wall 18b into a diffuser 102 and into the vehicle occupant restraint through exit holes 104.

A cylindrical ignition chamber housing 36b is formed as a continuation of the cylindrical manifold sidewall 26b. The ignition chamber housing 36b is disposed in a coaxial relationship with the outlet manifold 24b and piston 106. An annular body 44b of propellant is located in an ignition chamber 40b in the housing 36b having a lower (as viewed in FIG. 3) end wall 50b. A squib 48b is disposed in the body 44b of propellant. A plurality of conduits or passages 52b are formed in a side wall 116 of the ignition chamber housing 36b. The passages 52b are uncovered by motion of the piston 106. The passages 52b slope downward and tangentially outward toward the closed end wall 16b. The passages 52b are skewed, like the passage 52 of the embodiment of FIG. 1, at an angle of approximately 20° to a plane extending in a radial direction relative to the end walls 16b and 18b and perpendicular to the axis A of the inflator 10b.

The passages 52b direct a flow of combustion products from the ignition chamber 40b downward and sideward along an initial portion 62b of a helical path 64b toward the outlet end wall 16b. The outlet end wall 16b directs the combustion products back upwardly along a second, larger diameter portion 66b of the helical path 64b toward the outlet end wall 18b. As the combustion products flow along the helical path 64b, particulate and molten materials are separated from gaseous material in the combustion products by a centrifuging action as described above in connection with the embodiments of FIGS. 1 and 2.

Upon the occurrence of sudden vehicle deceleration, the squib 48b is ignited. Ignition of the squib 48b ignites the body 44b of propellant which creates pressure in chamber 40b and forces the piston 106 to move axially upward. As the piston 106 moves axially upward, the end wall 18b of the container 12b ruptures along the circular groove 112. This forms an opening for combustion products to flow from the outlet manifold chamber 30b into the diffuser 102 and through opening 104. Also, the piston movement opens passages 52b as noted above.

The piston 106 blocks a direct flow of combustion products from the ignition chamber 40b to the outlet manifold chamber 30b. Therefore, the combustion products flow from the ignition chamber 40b through the passages 52b into the main chamber 14b of the container 12b. As the combustion products move into the main chamber 14b, they move along the initial portion 62b of the helical path 64b toward the end wall 16b. The combustion products then flow back along the second portion 66b of the helical path 64b toward the outlet end wall 18b of the container 12b.

The combustion products next flow through the outlet manifold openings 34b into the outlet manifold chamber 30b. From the manifold chamber 30b, the combustion products flow through the opening formed in the outlet end wall 18b into the diffuser 102. The diffuser 102 directs the combustion products into an air bag.

From the above description of the invention, those skilled in the art will perceive improvements, changes and modifications. For example, the bodies of propellant 44 and 44a could be ignited after the squibs 32 and 32a. Thus, the stored gas is released from the containers 12 and 12a. After a predetermined time delay, the squibs 48 and 48a would be ignited. The greater the delay between ignition of the squibs 32, 32a and ignition of the squibs 48, 48a, the lower the output of the inflator. This would be useful to reduce output when the ambient temperature is high. Such improvements, changes and modifications within the skill of the art are intended to be covered by the appended claims.

Having described the invention, the following is claimed:

1. An apparatus for inflating a vehicle occupant restraint, said apparatus comprising:
   container means having a chamber for storing gas;
   a body of ignitable material;
   means for igniting the body of ignitable material to form combustion products including gaseous and other materials; and
   means for causing the combustion products to flow along a generally helical path in said chamber to at least partially separate the other materials from the gaseous materials while heating the gas in said chamber.

2. An apparatus as set forth in claim 1 wherein said means for causing the combustion products to flow along a generally helical path in said chamber includes conduit means for directing the combustion products into said chamber, said conduit means being skewed at an acute angle to a plane extending through said container means perpendicular to a longitudinal central axis of said container means.

3. An apparatus as set forth in claim 1 wherein said container means has a circular inner side surface which at least partially defines said chamber, said means for causing the combustion products to flow along a generally helical path including means for directing a flow of combustion products along the circular inner side surface of said container means.

4. An apparatus as set forth in claim 3 wherein said means for directing a flow of combustion products along the circular inner side surface of said container means is spaced from the circular inner side surface of said container means.

5. An apparatus as set forth in claim 3 wherein said means for directing a flow of combustion products along the circular inner side surface of said container means has an opening through which the combustion products flow in a direction which is skewed at an acute angle to a radial plane extending through the circular inner side surface area of said container means and perpendicular to the axis of said circular inner side surface.

6. An apparatus as set forth in claim 1 further including means for defining an ignition chamber in which said body of ignitable material is disposed, said means for causing the combustion products to flow along a generally helical path including means which at least partially defines an outlet from said ignition chamber.

7. An apparatus as set forth in claim 1 further including means for defining an ignition chamber in which said body of ignitable material is disposed, said means for causing the combustion products to flow along a generally helical path including means for causing the combustion products to flow along a generally helical path which extends around the outside of said ignition chamber.

8. An apparatus as set forth in claim 1 wherein said chamber in said container means has a circular inner side surface which is coaxial with a longitudinal central axis of said container means, said apparatus further including means for defining an ignition chamber which is disposed within said chamber in said container means and in which said body of ignitable material is disposed, and conduit means for conducting a flow of combustion products from the ignition chamber to a location adjacent to the circular inner side surface of said chamber in said container means, said means for causing the combustion products to flow along a generally helical path in said chamber in said container means including surface means for forming an outlet from said conduit means which is adjacent to the circular inner side surface area of said chamber in said container means and through which the combustion products flow in a direction which is skewed at an acute angle to a radial plane extending through the circular inner side surface of said chamber in said container means.

9. An apparatus as set forth in claim 1 wherein said chamber in said container means has a first end surface, a second end surface, and an outlet disposed adjacent to said second end surface, said means for causing the combustion products to flow along a generally helical path in said chamber including means for causing the combustion products to flow along a first portion of the helical path in a direction toward said first end surface of said chamber and then to flow along a second portion of the helical path in a direction away from said first end surface toward said second end surface and said outlet from said chamber.

10. An apparatus as set forth in claim 9 wherein said first portion of the helical path has a first diameter and the second portion of the helical path has a second diameter which is smaller than the first diameter.

11. An apparatus as set forth in claim 10 wherein said first portion of the helical path circumscribes at least part of said second portion of the helical path.

12. An apparatus as set forth in claim 9 wherein said chamber in said container means has a side surface which extends between said first and second end surfaces, said first portion of said helical path being disposed along said side surface.

13. An apparatus as set forth in claim 9 wherein said first end surface of said chamber has an arcuate configuration and extends transversely to a longitudinal central axis of the helical path along which the combustion products flow, said first end surface being cooperable with the flow of combustion products to reverse the direction of flow of the combustion products along the helical path from a direction toward said first end surface to a direction away from said first end surface toward said second end surface and said outlet from said chamber.

14. An apparatus as set forth in claim 13 wherein said first end surface of said chamber has a configuration which corresponds to the configuration of a portion of a sphere.

15. An apparatus as set forth in claim 1 further including means for defining an ignition chamber disposed outside of said chamber in said container means, said body of ignitable material being disposed in said ignition chamber, said means for causing the combustion products to flow along a generally helical path including means for conducting a flow of combustion products from said ignition chamber to said chamber in said container means.

16. An apparatus as set forth in claim 1 wherein said chamber in said container means has a first end surface, a second end surface, and an outlet disposed adjacent said second surface, said means for causing the combustion products to flow along a generally helical path in said chamber including means for directing a flow of combustion products toward said first end surface, said first end surface including surface means for directing the flow of combustion products back toward said second end surface and said outlet along the generally helical path in said chamber.

* * * * *